UNITED STATES PATENT OFFICE.

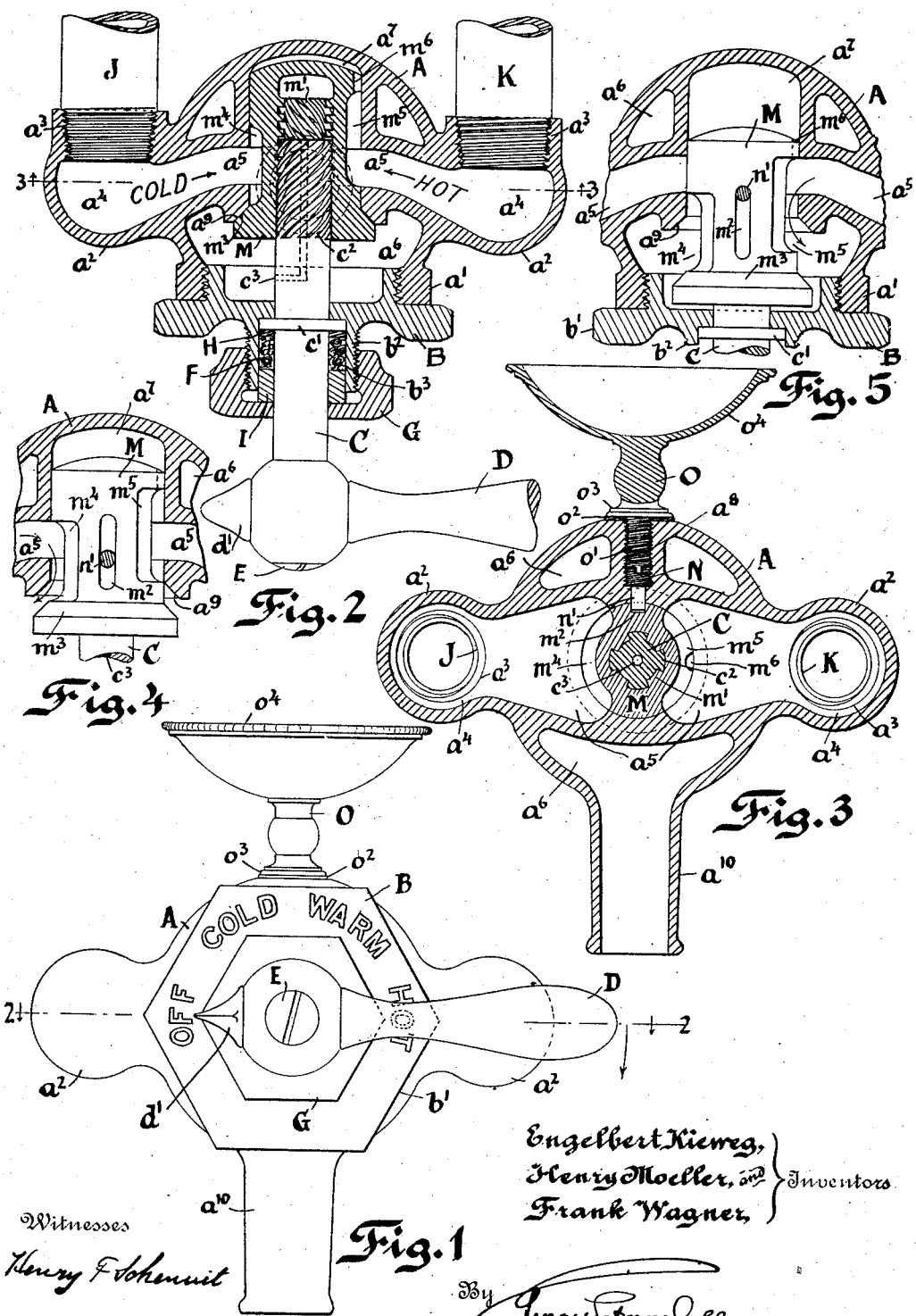

ENGELBERT KIEWEG, HENRY MOELLER, AND FRANK WAGNER, OF MILWAUKEE, WISCONSIN.

MIXING-VALVE.

1,025,575.   Specification of Letters Patent.   Patented May 7, 1912.

Application filed July 5, 1910. Serial No. 570,253.

*To all whom it may concern:*

Be it known that we, ENGELBERT KIEWEG, HENRY MOELLER, and FRANK WAGNER, of Milwaukee, Wisconsin, have invented a Mixing-Valve, of which the following is a specification.

Our invention relates to water-valves or faucets and has particular reference to that class of valve which is used for laboratory purposes for drawing from a single nozzle water of varying temperature provided by two pipes, the water of which is brought together and mixed in the desired proportion within the body of the valve.

The object of the invention is to provide an improved form of mixing-valve or faucet, and more particularly to provide a single compact bulb containing all the necessary appliances and performing all the necessary functions with a single plug.

Our invention may take many mechanical forms, all embodying its main principle, and may be used for such various purposes as will readily occur to those skilled in the art; but its most common use is in bath-tub and wash-basin faucets, and we have therefore, without wishing to be understood as limiting ourselves to such application, illustrated in the accompanying drawings one of such faucets constructed according to our invention.

In these drawings: Figure 1 is a front-elevation of the valve; Fig. 2 is an axial horizontal section therethrough, that is to say on the plane 2 of Fig. 1, showing the valve in the closed or "off" position; Fig. 3 is a central transverse section therethrough, that is to say on the plane 3 of Fig. 2; Fig. 4 is a fragmentary section on the plane 3, showing the valve-plug in elevation, in the "cold" position; and Fig. 5 is a similar fragmentary view showing the valve-plug in the "hot" portion.

In these drawings every reference letter refers always to the same part.

We have illustrated a spherical body A (although it is not necessarily spherical) provided at its front side with a circular opening reinforced by a ring $a'$ internally threaded as shown to receive the valve-bonnet B, which has conveniently a hexagonal edge $b'$ and is axially bored to receive the cylindrical valve-stem C, on the outer end of which a handle D is secured in place by a screw E or in any other convenient manner. The bonnet B is provided with a threaded-tubular-extension $b^2$, which is centrally bored to form a recess $b^3$ for packing F and is provided with a gland-nut G provided with an internal thread as shown, which engages the thread of the extension $b^2$. The valve-stem C is formed with an annular collar $c'$ which bears permanently upon the bottom of the recess $b^3$, and between it and the packing is preferably placed a bearing-washer H which forms a smoother bearing for the rotation of the stem than the packing would be. Above the packing, we preferably provide a packing-ring I, which fits neatly within the recess $b^3$ and serves to press down the packing as well as to form a long bearing for the valve-stem and support it against any force upon the handle D tending to bend it.

On either side of the spherical bulb of the member A are provided two auxiliary smaller globes $a^2$ which are open at the back and internally threaded as shown at $a^3$ to receive the cold- and hot-water pipes, designated respectively J and K. These deliver into the chambers $a^4$, formed within the auxiliary globes $a^2$, and therefrom lead passageways or ducts $a^5$, walled off from the main chamber $a^6$ of the central globe and communicating directly with a cylindrically bored chamber $a^7$, which is coaxial with the stem C and within which neatly fits and reciprocates the valve-plug M. This valve-plug is bored concentrically from the outer end to near the bottom and provided with a set of steep-pitched internal threads $m'$ with which engage similarly cut external threads $c^2$ on the end of the valve-stem; so that by turning the handle D, said valve-stem causes the plug M to reciprocate, the latter being held from turning by means of a pin $n'$ on the end of a screw N which fits in a threaded socket $a^8$ on the upper side of the valve, said socket $a^8$ being of course surrounded by metal and thus shut off from the main chamber $a^6$. The pin $n^1$ projects into a key way $m^2$ in the side of the plug. Leakage, around the screw N is prevented by an outer member O, which has a thread $o'$ engaging in the socket $a^8$ and a base-flange $o^3$ compressing a rubber washer or gasket $o^2$. The member O may, if desired, instead of lying flush with the surface of the valve-body A, be extended upwardly in an ornamental fashion, as shown, and provided with a dished receptacle $o^4$ for soap, etc.

The valve-plug is provided on its outer or front end with a conical enlargement or seating-face $m^3$, and on the edge of the cylindrical-bore $a^7$ with a conically bored seat $a^9$ therefor, so that when the handle D is turned into its limiting right-hand position, the face $m^3$ is brought up tight against the seat $a^9$ and the water thus shut off.

On the opposite sides of the valve-plug M are two recesses designated $m^4$ and $m^5$, which lie respectively opposite to the cold- and hot-water passages $a^5$; but these recesses lie at different distances from the front end of the plug, the cold-water recess $m^4$ beginning immediately under the seating-face $m^3$ and extending inwardly to a point a short distance beyond the passage $a^5$ when the plug is in the closed position; while the hot-water recess $m^5$ begins some distance from the seating-face $m^3$ and extends nearly or quite to the back end of the plug, and it may, if desired be connected by a passageway $m^6$ with the empty space $a^7$ beyond the plug so as to freely admit water to and from this space and avoid any difficulty which would otherwise occur in reciprocating the plug. The internal bore $m'$ may also be connected with the outer chamber $a^6$ for a like purpose by a tubular passageway $c^3$ in the stem C.

Now it will be observed that when the handle is turned from its closed position as shown in Figs. 1 and 2, in the direction of the arrow, Fig. 1, the first action will be to open the cold-water side, admitting cold water through the recess $m^4$ to the main chamber $a^6$, from whence it passes to a spout $a^{10}$ which leads therefrom; and as the turning of the handle is continued the cold water will be turned on more and more strongly until the plug reaches the position of Fig. 4, in which position the cold water is turned on full; but the hot-water side has not yet been opened, because in this position the outer edge of the recess $m^5$ has only just reached the outer end of the bore $a^7$. On further rotation of the handle, the cold water will be gradually shut off again by the rear-end of the plug, while the hot water is gradually turned on, thus mixing the two in a gradually increasing proportion of hot to cold, and producing warm; while a still further rotation of the handle to its opposite or open limit brings the plug into the position shown in Fig. 5, in which the cold water is entirely shut off while the hot water is turned on full, thus giving a continuous flow of hot water.

The various positions of the handle may if desired be designated in the manner shown in Fig. 1 by means of the words "Off", "Cold", "Warm", and "Hot", molded in raised letters upon the face of the bonnet B, and an index or pointer $d'$, which points to whichever one of these designations corresponds to the given position of the handle.

While we have hereinabove described the preferred form of our invention, we wish it understood that we do not limit ourselves to anyone of the particular features thereof, and we fully realize that it is capable of numerous modifications, and we consider such modifications and omissions may be made without departing from the principle of our invention.

Having thus described our invention, what we claim as new and desire to secure by Letters Patent is:—

1. In a mixing-valve, the combination with a cylindrical chamber having ports on opposite sides thereof, of a centrally closed valve-plug reciprocating in said chamber and having recesses on its opposite sides subtending the respective ports; and means for non-rotatively reciprocating said plug; both of said recesses lying within the outer margin of said chamber when the plug is in its inmost position; and one of said recesses being adapted to extend beyond the margin of said chamber before the other as said plug is moved out and further to pass beyond its port and close it off as said plug is further moved out while the other recess is still opposite to its port and extending beyond the margin of said chamber.

2. In a mixing-valve, the combination with a cylindrical chamber having ports on opposite sides thereof, of a centrally closed valve-plug reciprocating in said chamber and having recesses on its opposite sides subtending the respective ports, and means for non-rotatively reciprocating said plug; both of said recesses lying within the outer margin of said chamber when the plug is in its inmost position; and one of said recesses being adapted to extend beyond the margin of said chamber before the other as said plug is moved out and further to pass beyond its port and close it off as said plug is further moved out while the other recess is still opposite to its port and extending beyond the margin of said chamber; the margin of said chamber being provided with a valve-seat and the outer end of said plug being provided with a correspondingly formed seating-face adapted to coact therewith to completely shut off the flow.

3. In a mixing-valve, the combination with a cylindrical chamber having ports on opposite sides thereof, of a centrally closed valve-plug reciprocating in said chamber and having recesses on its opposite sides subtending the respective ports, a key adapted to prevent rotation of said plug while permitting its longitudinal reciprocation, said plug being provided with a concentric internal thread, and a rotatable valve-stem having an external thread engaging with said internal thread, said valve-stem being so mounted as to prevent longitudinal movement thereof; both of said recesses lying within the outer margin of said chamber when the plug is in its inmost position; and one of said recesses being adapted to extend beyond the margin of said chamber before the other as said plug is moved out and further to pass beyond its port and close it off as said plug is further moved out while the other recess is still opposite to its port and extending beyond the margin of said chamber.

4. In a mixing-valve, the combination with a cylindrical chamber having ports on opposite sides thereof, of a centrally closed valve-plug reciprocating in said chamber and having recesses on its opposite sides subtending the respective ports, a key adapted to prevent rotation of said plug while permitting its longitudinal reciprocation, said plug being provided with a concentric internal thread, and a rotatable valve-stem having an external thread engaging with said internal thread, said valve-stem being so mounted as to prevent longitudinal movement thereof; both of said recesses lying within the outer margin of said chamber when the plug is in its inmost position; and one of said recesses being adapted to extend beyond the margin of said chamber before the other as said plug is moved out and further to pass beyond its port and close it off as said plug is further moved out while the other recess is still opposite to its port and extending beyond the margin of said chamber; the margin of said chamber being provided with a valve-seat and the outer end of said plug being provided with a correspondingly formed seating-face adapted to coact therewith to completely shut off the flow.

In witness whereof we have hereunto set our hands in presence of two witnesses.

ENGELBERT KIEWEG.
HENRY MOELLER.
FRANK WAGNER.

Witnesses:
RICHARD ELSNER,
HERMAN FECHNER.

Copies of this patent may be obtained for five cents each, by addressing the "Commissioner of Patents, Washington, D. C."